United States Patent
Stokes

(10) Patent No.: US 6,851,337 B2
(45) Date of Patent: Feb. 8, 2005

(54) METHOD AND APPARATUS FOR TURNING A SET SCREW FOR A YOKE

(75) Inventor: James E. Stokes, St. Louis, MO (US)

(73) Assignee: Pacific Rim Direct, Ltd., St. Louis, MO (US)

( * ) Notice: Subject to any disclaimer, the term of this patent is extended or adjusted under 35 U.S.C. 154(b) by 0 days.

(21) Appl. No.: 10/462,848

(22) Filed: Jun. 16, 2003

(65) Prior Publication Data

US 2004/0250662 A1 Dec. 16, 2004

(51) Int. Cl.[7] .............................................. B25B 13/48
(52) U.S. Cl. ..................... 81/124.7; 81/124.3; 81/176.1
(58) Field of Search ................................ 81/124.7, 119, 81/124.3, 176.1

(56) References Cited

U.S. PATENT DOCUMENTS

| | | | |
|---|---|---|---|
| 151,635 A | | 6/1874 | Uhlinger et al. |
| 1,226,228 A | * | 5/1917 | McKinzie ................... 81/125.1 |
| 1,732,549 A | | 10/1929 | Armstrong |
| 1,867,372 A | | 7/1932 | McGuckin |
| 2,445,905 A | * | 7/1948 | Busby ....................... 81/124.3 |
| D173,939 S | | 2/1955 | Deliso |
| 3,071,995 A | | 1/1963 | Ruthrauff, Jr. |
| 3,151,512 A | | 10/1964 | Charczenko |
| 4,480,514 A | | 11/1984 | Ponziani |
| 4,562,758 A | * | 1/1986 | Stirling ..................... 81/124.4 |
| D292,477 S | | 10/1987 | Shyi-Kuan |
| 4,871,144 A | | 10/1989 | Kaniaris |
| 5,313,860 A | * | 5/1994 | Liou ........................... 81/437 |
| 5,542,321 A | | 8/1996 | Fuca |
| D387,640 S | | 12/1997 | Von Fange |
| 5,704,589 A | | 1/1998 | Canuteson |
| 6,314,841 B1 | | 11/2001 | Burk et al. |
| 6,439,343 B1 | | 8/2002 | Jorges et al. |
| 6,505,532 B1 | | 1/2003 | Lawson |

* cited by examiner

*Primary Examiner*—David B. Thomas
(74) *Attorney, Agent, or Firm*—Sonnenschein Nath & Rosenthal LLP

(57) ABSTRACT

A wrench for turning a gas tank yoke set screw having a transverse torque bar about a set screw axis to selectively mount the yoke on a valve body and dismount the yoke from the valve body. The wrench includes a wrench head including a face having an elongate groove extending along a central longitudinal groove axis between opposite first and second ends of the groove for receiving the torque bar. The groove has opposing side walls extending generally parallel to the central longitudinal groove axis between the first and second ends of the groove and is spaced apart by a distance generally equal to a width of the torque bar so that the groove engages the torque bar when the torque bar is received by the groove. The side walls extend inward into the wrench head from the face to a groove bottom. The wrench further includes an elongate wrench handle extending outward from the wrench head to provide a torque arm for turning the wrench head when the torque bar is received by the groove and thereby turn the gas tank yoke set screw about its axis to selectively mount the yoke on a valve body and dismount the yoke from the valve body.

20 Claims, 4 Drawing Sheets

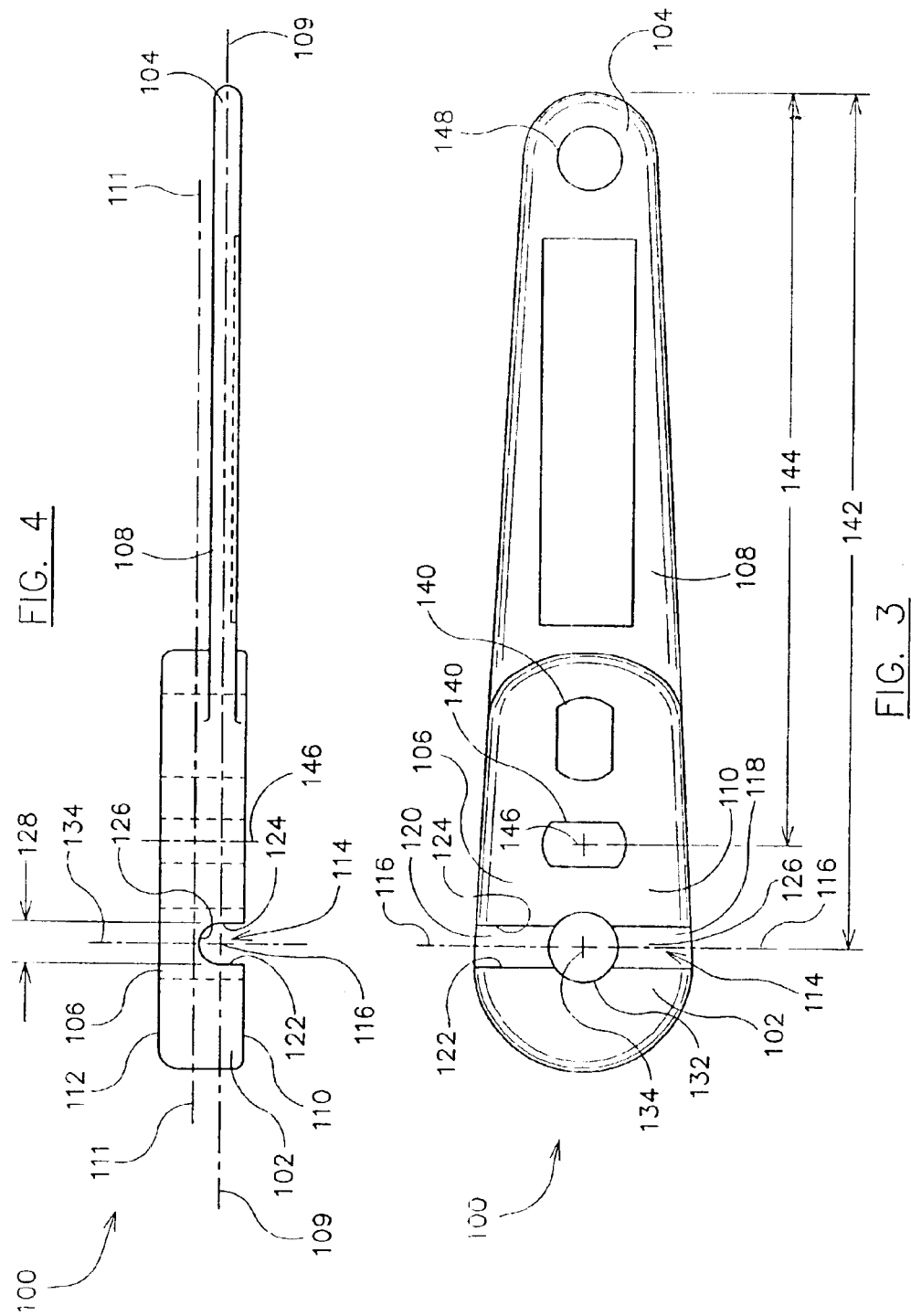

METHOD AND APPARATUS FOR TURNING A SET SCREW FOR A YOKE

BACKGROUND OF THE INVENTION

The present invention relates generally to gas tank yokes, and more specifically to a method and apparatus for turning a set screw for a gas tank yoke.

Yokes are typically used to mount gas-transmitting structures, such as gas lines, gas flow regulators, and gas measurement equipment, onto tanks containing pressurized gas. The yoke is typically mounted on a valve coupled to the gas tank and facilitates withdrawing gas from the tank. A set screw threadably connected to the yoke engages a portion of the valve received by the yoke to securely hold the yoke on the valve. A coupling element on the yoke is coupled to the gas-transmitting structures and includes an opening in fluid communication with the gas-transmitting structures. When the yoke is securely mounted on the valve, the valve can be opened to allow gas to flow through the coupling element and into the gas-transmitting structures for delivery from the tank to, for example, a medical patient requiring oxygen.

To facilitate turning, set screws typically include a torque bar extending transversely from an outer end of the set screw. However, using the torque bar alone, it may be difficult to apply enough torque to the set screw to securely fasten the yoke to the valve. Although some yoke set screws include wrench flats on an outer end of the screw to facilitate turning the set screw with the aid of a conventional wrench, many yoke set screws do not include wrench flats.

SUMMARY OF THE INVENTION

In one aspect, the present invention includes a wrench for turning a gas tank yoke set screw having a transverse torque bar about a set screw axis to selectively mount the yoke on a valve body and dismount the yoke from the valve body. The wrench includes a wrench head including a face having an elongate groove extending along a central longitudinal groove axis between opposite first and second ends of the groove for receiving the torque bar. The groove has opposing side walls extending generally parallel to the central longitudinal groove axis between the first and second ends of the groove and spaced apart by a distance generally equal to a width of the torque bar so that the groove engages the torque bar when the torque bar is received by the groove. The side walls extend inward into the wrench head from the face to a groove bottom. The wrench further includes an elongate wrench handle extending outward from the wrench head to provide a torque arm for turning the wrench head when the torque bar is received by the groove and thereby turn the gas tank yoke set screw about its axis to selectively mount the yoke on a valve body and dismount the yoke from the valve body.

In another aspect, the present invention includes a wrench having a wrench head including a face having an elongate groove extending along a central longitudinal groove axis between opposite first and second ends of the groove. The groove has opposing side walls extending generally parallel to the central longitudinal groove axis between the first and second ends of the groove and extending inward into the wrench head from the face to a rounded groove bottom. The wrench further includes an elongate wrench handle extending outward from the wrench head to provide a torque-arm for turning the wrench head. At least a portion of the elongate wrench handle and the central longitudinal axis of the groove are coplanar.

In yet another aspect, a method is provided for turning a gas tank yoke set screw having a transverse torque bar about a set screw axis to selectively mount a gas tank yoke on a valve body and dismount the yoke from the valve body. The method includes the steps of installing a wrench on the set screw so the torque bar is received by a groove in a head of the wrench, and turning a handle of the wrench when the torque bar is received by the groove in the head of the wrench thereby turning the gas tank yoke set screw about its axis.

Other features of the present invention will be in part apparent and in part pointed out hereinafter.

BRIEF DESCRIPTION OF THE DRAWINGS

FIG. 3 is a top plan of a wrench of the present invention;

FIG. 4 is a front elevation of the wrench shown in FIG. 3; and

Corresponding reference characters indicate corresponding parts throughout the several views of the drawings.

DETAILED DESCRIPTION OF THE PREFERRED EMBODIMENT

Figure 1:
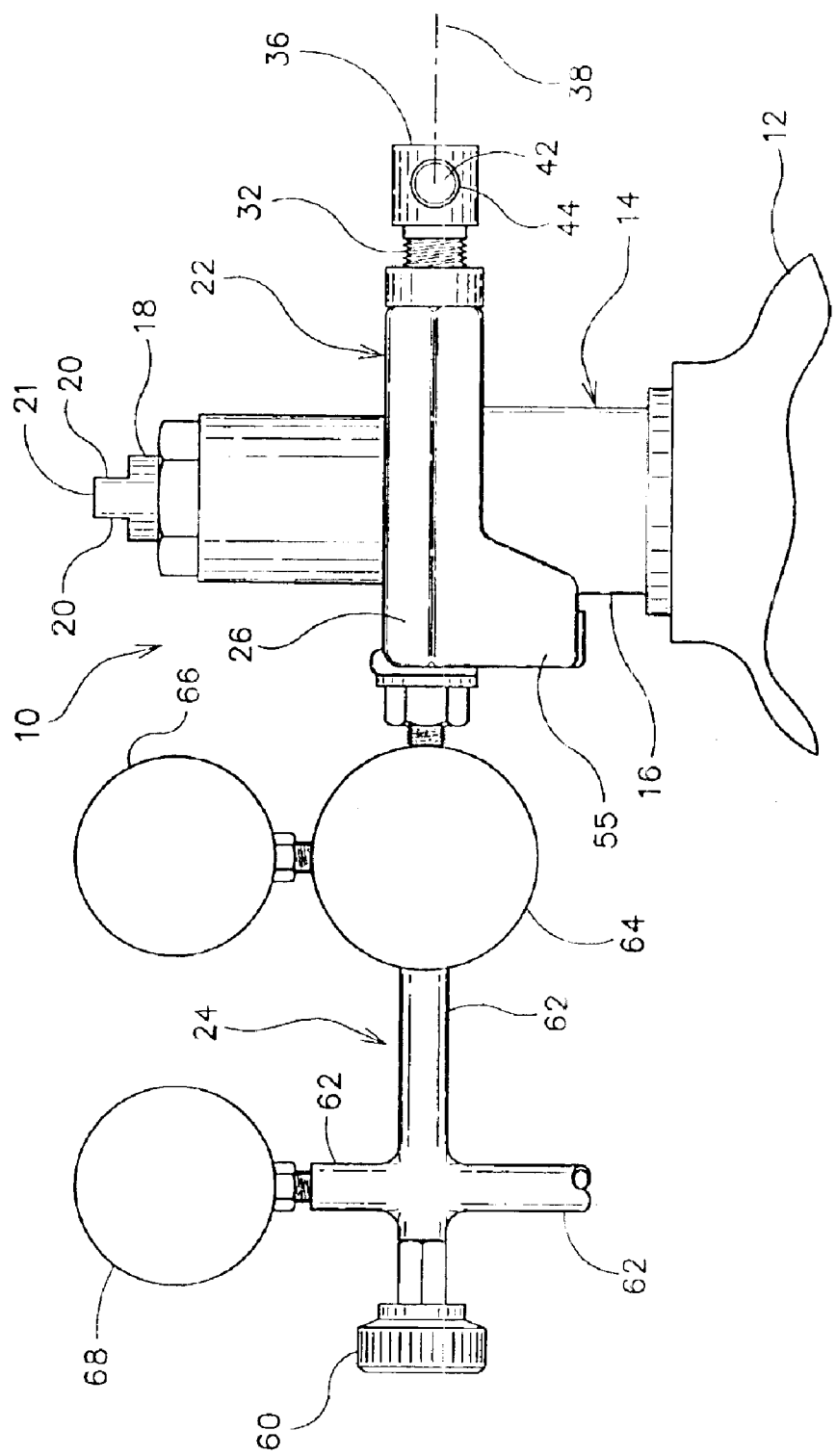
FIG. 1 is a fragmentary front elevation of a gas tank system having a yoke connected to a gas tank valve body and supporting gas transmitting structures.
Figure 2:
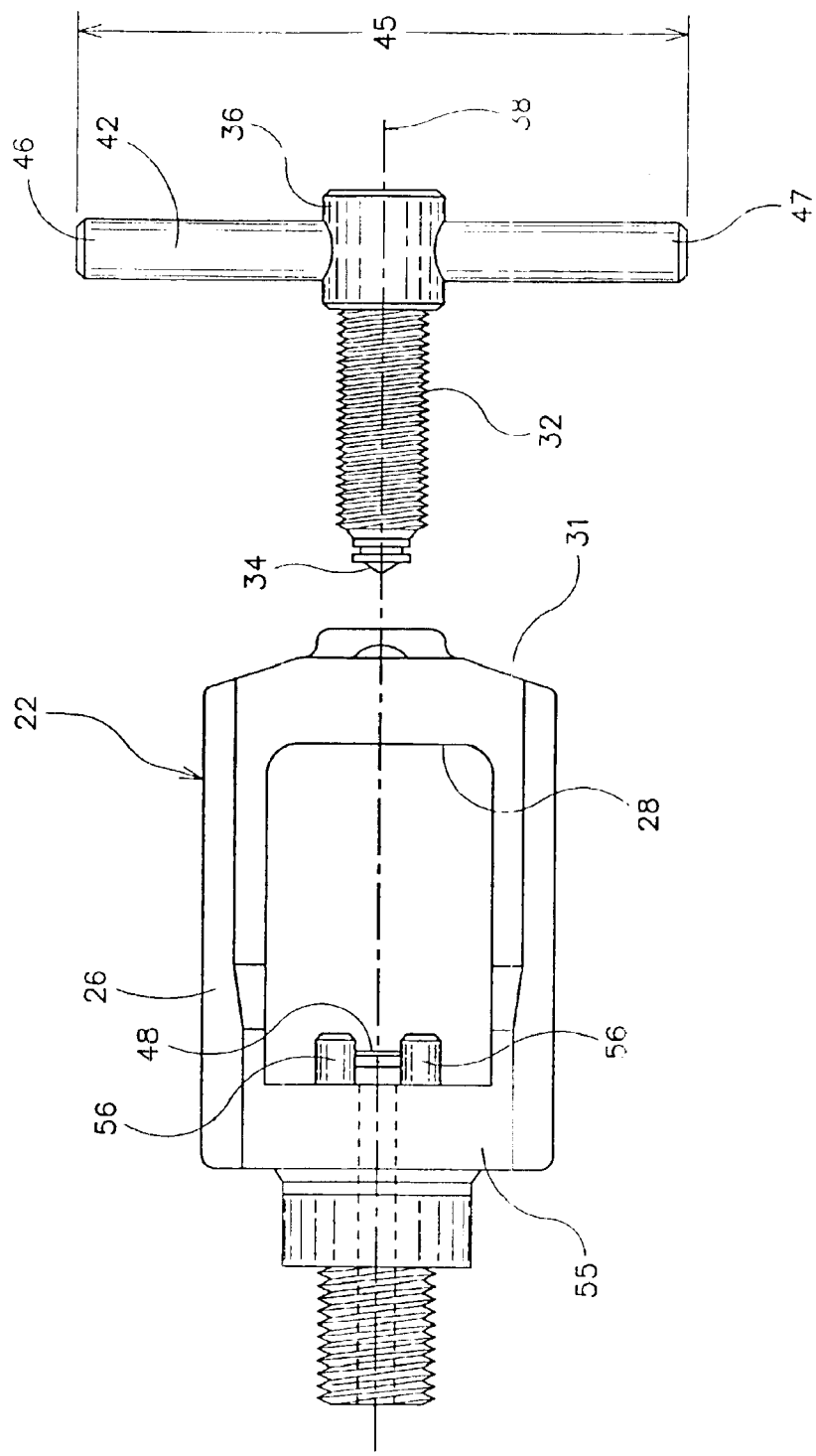
FIG. 2 is an exploded top plan of the yoke shown in FIG. 1.

Now referring to the drawings, and specifically to FIGS. 1 and 2, a gas tank system generally indicated by the reference numeral 10 includes a gas tank 12 containing pressurized gas, for example oxygen. A valve, generally designated by the reference numeral 14, is coupled to the tank 12 and includes a valve body 16 having a valve stem 18 extending outward therefrom. The valve stem 18 can be turned relative to the valve body 16 to selectively open the valve 14 to permit gas flow from the tank 12, and close the valve 14 to prevent gas flow from the tank 12. The valve stem 18 has a pair of wrench flats 20 on opposite sides of its upper end 21 to facilitate opening and closing the valve 14 using a conventional wrench. The system 10 further includes a yoke, generally designated by the reference numeral 22, which mounts gas-transmitting structures, generally designated by the reference numeral 24, such as gas lines, gas flow regulators, gas flow control knobs, and gas measurement equipment, onto the valve 14 for metered delivery of gas flow from the tank 12 to, for example, a patient using supplemental oxygen.

As illustrated in FIG. 2, the yoke 22 includes a generally rectangular body 26 having a central opening 28 sized and shaped to receive a portion of the valve body 16. The yoke body 26 has a threaded opening (not shown) at an end opposite the gas-transmitting structures 24 that threadably receives a set screw 32. The set screw 32 extends between an inner end 34 and an outer end 36 along a central longitudinal screw axis 38. The inner end 34 extends into the yoke body central opening 28, and is tapered to securely engage an indentation (not shown) in the valve body 16 for releasably mounting the yoke 22 in a fixed position on the valve body 16. The outer end 36 extends outward from the yoke body 26 and includes a torque bar 42 coupled thereto and extending transversely with respect to the central longitudinal axis 38. The torque bar 42 extends through a diametrical hole 44 (FIG. 1) in the set screw outer end 36. In an alternative embodiment, the torque bar 42 is coupled to the set screw 32 between the outer end 36 and the inner end 34. In one embodiment, the torque bar 42 is fixedly coupled to the set screw 32 in the hole 44 to prevent lateral movement of the torque bar 42 relative to the set screw 32. In an alternative embodiment, the torque bar 42 is slidably received in the hole 44 to allow sliding lateral movement of the torque bar 42 relative to the set screw 32. The torque bar 42 extends a length 45 measured between opposite ends 46, 47 of the bar 42.

Although the torque bar 42 may have other shapes without departing from the scope of the present invention, in one embodiment the torque bar 42 is cylindrical. Additionally, in one embodiment, the set screw outer end 36 includes a pair of oppositely disposed wrench flats (not shown) to facilitate turning the set screw 32 with a conventional wrench. In one embodiment, the cross-sectional shape and size of the set screw outer end 36 having the wrench flats is generally equal to the cross-sectional size and shape of the valve stem upper end 21.

To couple the yoke 22 to the valve body 16, the yoke 22 is slid down over the valve body 16 until the set screw 32 is aligned with the indentation in the valve body 16 and a coupling stem 48 of the gas transmitting structures 24 is aligned with a orifice (not shown) in the valve body 16. The coupling stem 48 is coupled to the gas transmitting structures 24 and extends through an opening (not shown) in a second end 55 of the yoke body 26 into the yoke body central opening 28. Using the torque bar 42 or the wrench flats on the set screw outer end 36, the set screw 32 is then turned about the set screw central longitudinal axis 38 until the set screw 32 securely seats in the valve body indentation and thereby securely holds the yoke 22 in a fixed position on the valve body 16. When the set screw 32 is tightened against the valve body 16, locator members 56 on the yoke 22 mate with holes (not shown) within the valve body, and the coupling stem 48 of the gas transmitting structures 24 seats in the orifice in the valve body 16. The coupling stem 48 includes a seal (not shown) that engages the valve body 16 around the orifice to prevent gas flow leakage to the environment as the gas flows from the tank 12 through the coupling stem 48. When the valve stem 18 is turned to open the valve 14, gas flows out of the gas tank 12 through the coupling stem 48 and into the gas transmitting structures 24. Once in the gas transmitting structures 24, the gas flow is delivered to a patient by turning a flow control knob 60 to open and close the gas transmitting structures 24 leading from the coupling stem 48 and the valve 14. In the exemplary embodiment, the gas transmitting structures 24 include the flow control knob 60, a plurality of gas flow lines 62 for carrying the gas flow, a pressure regulator 64, a gas tank contents gauge 66, and a flow indicator gauge 68.

FIG. 3 illustrates a wrench 100 of the present invention for turning the set screw 32 (FIGS. 1 and 2) to selectively mount the yoke 22 (FIGS. 1 and 2) in a fixed position on the valve body 16 (FIGS. 1 and 2) and dismount the yoke 22 from the valve body 16. As illustrated in FIG. 4, the wrench 100 extends between a first end 102 and a second end 104, and includes a wrench head 106 at the first end 102 and an elongate wrench handle 108 extending outward from the wrench head 106 to the wrench second end 104 along a central longitudinal handle axis 109 to provide a torque arm for turning the wrench head 106. The wrench head 106 extends between the wrench first end 102 and the wrench handle 108 along a central longitudinal head axis 111, and includes a first face 110, a second face 112, and an elongate groove 114 within the first face 110 for receiving the torque bar 42. The elongate groove 114 extends along a central longitudinal groove axis 116 between opposite first and second ends 118, 120 of the groove 114, and includes opposing side walls 122, 124 extending generally parallel to the groove axis 116 between the groove first and second ends 118, 120. In one embodiment, the central longitudinal groove axis 116 extends generally perpendicular to the elongate wrench handle 108, and more specifically the central longitudinal handle axis 109.

The opposing side walls 122, 124 extend inward into the wrench head 106 from the first face 110 to a groove bottom 126 extending generally parallel to the groove axis 116 between the groove first and second ends 118, 120. The opposing side walls 122, 124 are spaced by a distance 128 generally equal to a width 130 of the torque bar 42 so the groove 114 snuggly engages the torque bar 42 when it is received by the groove 114. In one embodiment, the opposing side walls 122, 124 are spaced by a distance generally equal to a diameter of the torque bar 42. Although the groove bottom 126 may have other shapes without departing from the scope of the present invention, in one embodiment the groove bottom is rounded and has a diameter generally equal to a width 130 (e.g. a diameter) of the torque bar 42.

In one embodiment, the elongate wrench handle 108 at least partially lies within a plane extending generally parallel to the central longitudinal groove axis 116 and the central longitudinal handle axis 109. Additionally, in one embodiment the central longitudinal groove axis 116 and the elongate wrench handle 108 both at least partially lie within a plane extending generally parallel to the central longitudinal groove axis 116 and the central longitudinal handle axis 109. Thus, at least a portion of the wrench handle 108 and the central longitudinal groove axis 116 are coplanar.

The wrench head 106 further includes an opening 132 extending along a central opening axis 134 and inward into the wrench head 106 from the first face 110. The opening 132 is sized to receive the set screw outer end 36 (FIGS. 1 and 2) and is positioned on the wrench head 106 with respect to the elongate groove 114 so that the opening 132 intersects the groove 114 midway along its length. In one embodiment, the opening 132 extends completely through the wrench head 106 from the first face 110 to the second face 112. Additionally, in one embodiment, the central opening axis 134 extends generally perpendicular to the central longitudinal groove axis 116.

In one embodiment, the wrench head 106 includes a wrench flat opening 140 extending into the wrench head 106 from the first face 110. In one embodiment, the wrench flat opening 140 is sized and shaped to conform to the cross-sectional shape of the set screw outer end 36 having the wrench flats so the wrench 100 can be used to turn the set screw 32 having the wrench flats without using the torque bar 42. In another embodiment, the wrench flat opening 140 is sized and shaped to conform to the cross-sectional shape of the outer end of the valve stem 18 so the wrench 100 can be used to turn the valve stem 18 and thereby selectively open and close the valve 14. Additionally, in one embodiment the wrench flat opening 140 extends completely through the wrench head 106 from the first face 110 to the second face 112. When the set screw outer end 36 is received by the wrench flat opening 140, the wrench 100 engages the wrench flats so the wrench 100 and the set screw 32 are connected for simultaneous rotation about the central longitudinal screw axis 38. The wrench 100 may be connected to the valve stem upper end 21 by inserting the valve stem 18 into the wrench flat opening 140 of the wrench 100 so the wrench 100 engages the valve stem flats 20 allowing the wrench 100 and the valve stem 18 to be simultaneously turned about the central longitudinal screw axis 38.

The elongate wrench handle 108 has a first length 142 measured between the central opening axis 134 and the wrench second end 104. In one embodiment, the wrench handle length 142 is greater than the length 45 of the torque bar 42. In another embodiment, the elongate wrench handle 108 length 142 is greater than half the length 45 of the torque bar 42. Additionally, the elongate wrench handle 108 extends a second length 144 measured between a central axis 146 of the wrench flat opening 140 and the wrench second end 104. In one embodiment, the second length 144 is greater than the length 45 of the torque bar 42. In another embodiment, the second length 144 is greater than half the length 45 of the torque bar 42. In one embodiment, the wrench 100 includes another opening 148 extending through the wrench handle 108 adjacent the wrench second end 104 for attachment to a belt, a key chain, a key ring, or other suitable device. In addition, in one embodiment the wrench handle 108, and more specifically the central longitudinal handle axis 109, is offset from the central longitudinal head axis 111 towards the wrench head first face 110 so the central longitudinal handle axis 109 intersects the central longitudinal groove axis 116 generally perpendicular to the groove axis 116. Such an alignment facilitates preventing the wrench 100 from rotating about the central longitudinal groove axis 116 when applying torque to the torque bar 42.

Figure 5:
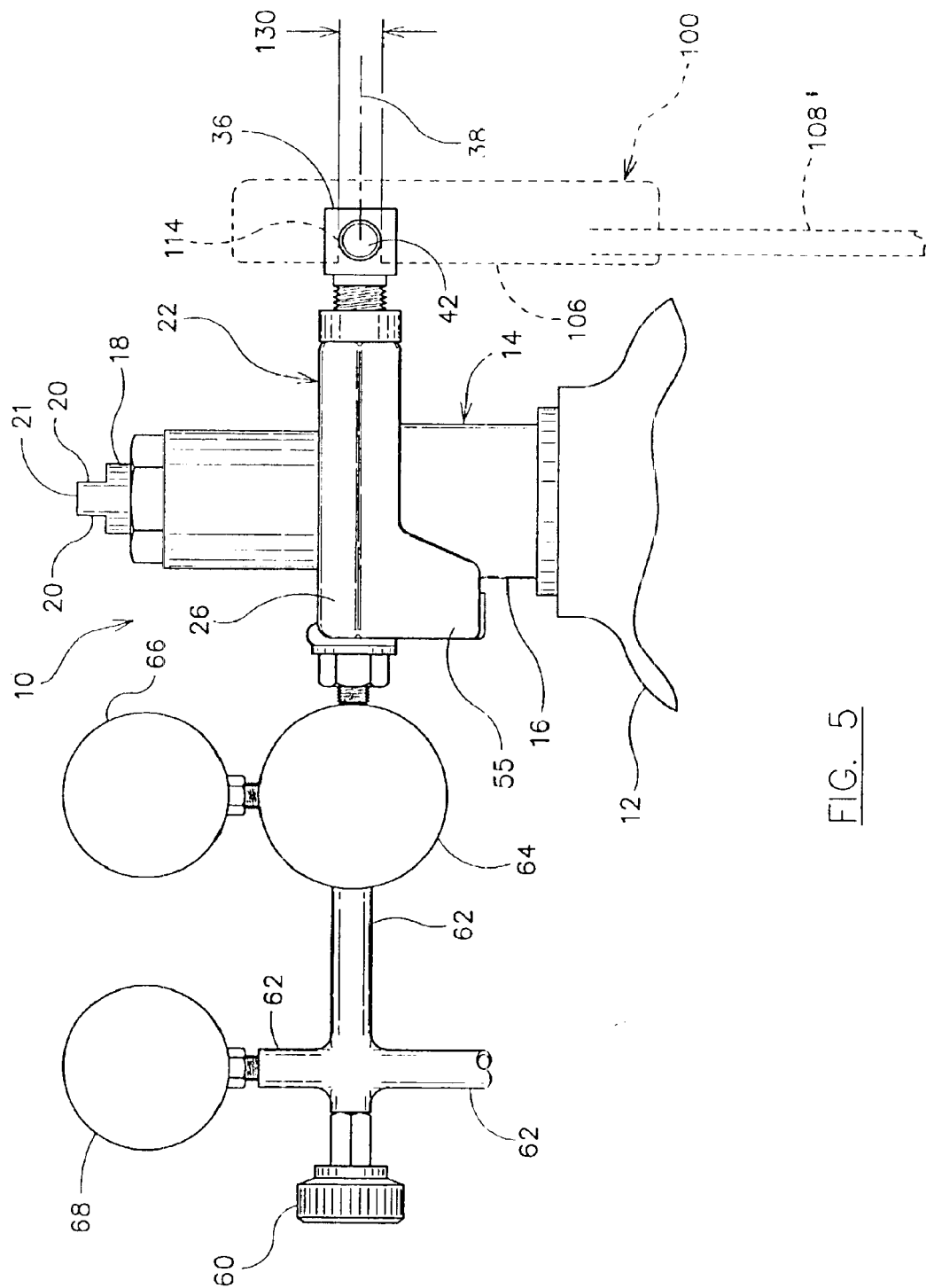
FIG. 5 is a front elevation of the set screw shown in FIGS. 1 and 2 having the wrench shown in FIGS. 3 and 4 installed thereon.

As illustrated in FIG. 5, to turn the set screw 32 to selectively mount the yoke 22 on the valve body 16 and dismount the yoke 22 from the valve body 16, the wrench 100 is installed on the set screw 32. When the wrench 100 is installed on the set screw 32, the side walls 122, 124 (FIGS. 3 and 4) of the groove 114 engage the torque bar 42. The wrench handle 108 can then be turned about the central longitudinal screw axis 38 to thereby turn the torque bar 42 and the set screw 32. The wrench handle 108 provides a torque arm for turning the wrench head 106 to selectively mount the yoke 22 on the valve body 16 and dismount the yoke 22 from the valve body 16.

The above-described wrench is cost-effective and reliable for turning a yoke set screw about its axis to selectively mount a yoke on a valve body and dismount the yoke from the valve body. More specifically, the present invention increases a length of a torque arm applied to the set screw. Additionally, the wrench described herein is suitable for use in combination with a torque bar with both yoke set screws that do and do not include wrench flats. The present invention also includes an opening configured to snuggly receive the outer end of a yoke set screw having wrench flats so the wrench can be used to turn the set screw about its axis without using the torque bar. The above-described wrench is relatively small, light, and inexpensive, and is configured for convenient transport by attachment to a belt, key chain, or key ring. However, the present invention is of sufficient strength and size to apply a generous amount of torque to a yoke set screw to selectively mount the yoke on a valve body and dismount the yoke from the valve body without damaging the yoke.

Although the invention is herein described and illustrated in association with gas tank yoke, and more specifically, in association with turning a set screw for a gas tank yoke, it should be understood that the present invention is generally applicable to turning any fastening mechanism having a torque bar extending transversely about a central longitudinal axis of the fastening mechanism. Accordingly, practice of the present invention is not limited to turning set screws for gas tank yokes, nor is practice of the present invention limited to gas tank yokes generally. Additionally, although the invention is herein described and illustrated in association with a gas tank containing pressurized oxygen, it should be understood that the present invention is generally applicable to gas tanks containing other types of pressurized gas, such as Nitrogen or Helium. Accordingly, practice of the present invention is not limited to the gas tanks containing pressurized oxygen.

When introducing elements of the present invention or the preferred embodiment(s) thereof, the articles "a", "an", "the" and "said" are intended to mean that there are one or more of the elements. The terms "comprising", "including" and "having" are intended to be inclusive and mean that there may be additional elements other than the listed elements.

As various changes could be made in the above constructions without departing from the scope of the invention, it is intended that all matter contained in the above description or shown in the accompanying drawings shall be interpreted as illustrative and not in a limiting sense.

What is claimed:

1. A wrench for turning a gas tank yoke set screw having a transverse torque bar about a set screw axis to selectively mount the yoke on a valve body and dismount the yoke from the valve body, said wrench comprising:

a wrench head including a face having an elongate groove extending along a central longitudinal groove axis between opposite first and second ends of the groove for receiving the torque bar, said groove having opposing side walls extending generally parallel to said central longitudinal groove axis between said first and second ends of the groove and being spaced apart by a distance generally equal to a width of the torque bar so that said groove engages said torque bar when the torque bar is received by the groove, said side walls extending inward into said wrench head from said face to a groove bottom;

an opening in the wrench head intersecting the groove and extending through the wrench head; and an elongate wrench handle extending outward from the wrench head to provide a torque arm for turning the wrench head when the torque bar is received by the groove and thereby turn the gas tank yoke set screw about its axis to selectively mount the yoke on a valve body and dismount the yoke from the valve body.

2. A wrench in accordance with claim 1 wherein said groove bottom is a rounded groove bottom having a diameter generally equal to the width of the torque bar.

3. A wrench in accordance with claim 1 wherein said elongate wrench handle extends outward from the wrench head to provide torque for turning the wrench head, at least a portion of said elongate wrench handle and said central longitudinal groove axis being coplanar.

4. A wrench in accordance with claim 1 wherein said opening is sized to receive an end of the gas tank yoke set screw when the torque bar is received by said groove.

5. A wrench in accordance with claim 1 wherein said opening has a central axis extending generally perpendicular to said central longitudinal groove axis.

6. A wrench in accordance with claim 1 wherein said opening intersects said groove midway along a length of said groove.

7. A wrench in accordance with claim 1 wherein said groove extends generally perpendicular to said wrench handle.

8. A wrench in accordance with claim 1 wherein said wrench head includes a wrench opening adapted for receiving an end of the set screw having wrench flats.

9. A wrench in accordance with claim 8 wherein said wrench opening is sized and shaped for engaging the wrench flats when the set screw is received by said wrench opening.

10. A wrench in accordance with claim 1 wherein said elongate wrench handle has a length greater than a length of the torque bar.

11. A wrench for turning a gas tank yoke set screw having a transverse torque bar about a set screw axis to selectively mount the yoke on a valve body and dismount the yoke from the valve body, said wrench comprising:

a wrench head including a face having an elongate groove extending along a central longitudinal groove axis between opposite first and second ends of the groove, said groove having opposing side walls extending generally parallel to said central longitudinal groove axis between said first and second ends of the grove and extending inward into said wrench head from said face to a rounded groove bottom;

an opening in the wrench head intersecting the groove and extending through the wrench head; and an elongate wrench handle extending outward from the wrench head to provide torque for turning the wrench head, at least a portion of said elongate wrench handle and said central longitudinal groove axis being coplanar.

12. A wrench in accordance with claim 11, said groove adapted to receive the torque bar, said side walls being spaced apart by a distance generally equal to a width of the torque bar so that said groove engages the torque bar when the torque bar is received by the groove.

13. A wrench in accordance with claim 11 wherein said rounded groove bottom has a diameter generally equal to the width of the torque bar.

14. A wrench in accordance with claim 11 wherein said opening is sized to receive an end of a set screw for a gas tank yoke.

15. A wrench in accordance with claim 11 wherein said opening has a central axis extending generally perpendicular to said central longitudinal axis of said groove.

16. A wrench in accordance with claim 11 wherein said opening intersects said groove midway along a length of said groove.

17. A wrench in accordance with claim 11 wherein said central longitudinal groove axis extends generally perpendicular to said elongate wrench handle.

18. A wrench in accordance with claim 11 wherein said wrench head includes a wrench opening adapted for receiving an end of a gas tank yoke set screw having wrench flats.

19. A wrench in accordance with claim 18 wherein said wrench opening is sized and shaped for engaging the wrench flats when the set screw is received by said wrench opening.

20. A wrench for turning a gas tank yoke set screw having a transverse torque bar about a set screw axis to selectively mount the yoke on a valve body and dismount the yoke from the valve body, said wrench comprising:

a wrench head including a face having an elongate groove extending along a central longitudinal groove axis between opposite first and second ends of the groove for receiving the torque bar, said groove having opposing side walls extending generally parallel to said central longitudinal groove axis between said first and second ends of the groove and being spaced apart by a distance generally equal to a width of the torque bar so that said groove engages said torque bar when the torque bar is received by the groove, said side walls extending inward into said wrench head from said face to a groove bottom;

an opening in the wrench head intersecting the groove; and an elongate wrench handle extending outward from the wrench head to provide a torque arm for turning the wrench head when the torque bar is received by the groove and an outer end of the set screw is received by the opening to thereby turn the gas tank yoke set screw about its axis to selectively mount the yoke on a valve body and dismount the yoke from the valve body, wherein a central axis of the opening extends generally non-parallel to the wrench handle and the central longitudinal groove axis extends generally non-parallel to the wrench handle.

* * * * *